US011215236B2

(12) United States Patent
Kobayashi et al.

(10) Patent No.: US 11,215,236 B2
(45) Date of Patent: Jan. 4, 2022

(54) CLUTCH DEVICE

(71) Applicant: Kabushiki Kaisha F.C.C., Shizuoka (JP)

(72) Inventors: Yuki Kobayashi, Shizuoka (JP); Hideyuki Oishi, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 29 days.

(21) Appl. No.: 16/617,351

(22) PCT Filed: May 8, 2018

(86) PCT No.: PCT/JP2018/017822
§ 371 (c)(1),
(2) Date: Nov. 26, 2019

(87) PCT Pub. No.: WO2018/221135
PCT Pub. Date: Dec. 6, 2018

(65) Prior Publication Data
US 2021/0123482 A1    Apr. 29, 2021

(30) Foreign Application Priority Data
Jun. 1, 2017   (JP) .............................. JP2017-108974

(51) Int. Cl.
*F16D 13/70* (2006.01)
*F16D 13/52* (2006.01)
*F16D 23/12* (2006.01)

(52) U.S. Cl.
CPC ............. *F16D 13/52* (2013.01); *F16D 23/12* (2013.01); *F16D 2023/123* (2013.01)

(58) Field of Classification Search
CPC .... F16D 13/52–2013/565; F16D 23/12; F16D 2023/123
See application file for complete search history.

(56) References Cited

U.S. PATENT DOCUMENTS 9,546,697 B2* 1/2017 Chiba .................... F16H 63/30
10,247,260 B2* 4/2019 Kataoka ................. F16D 23/12
(Continued)

FOREIGN PATENT DOCUMENTS

EP    2530348 A1    12/2012
FR    2709795 A1    3/1995
(Continued)

OTHER PUBLICATIONS

International Search Report (ISR) dated Jul. 31, 2018 filed in PCT/JP2018/017822.
(Continued)

*Primary Examiner* — Charles A Fox
*Assistant Examiner* — Farhana Pervin
(74) *Attorney, Agent, or Firm* — Rankin, Hill & Clark LLP

(57) ABSTRACT

A clutch apparatus is provided which includes a center clutch and a pressure clutch that can hold a clutch plate without falling off of the clutch plate and also prevent a reduction in strength. A clutch apparatus 100 includes a center clutch 105 and a pressure clutch 112, which hold clutch plates 104 placed facing friction plates 103 that are rotationally driven by a driving shaft. The center clutch 105 includes a center-side mating portion 108 mating with internal teeth of the clutch plate 104. In addition, the center-side mating portion 108 includes a protruding tooth 110. The pressure clutch 112 includes a pressure-side mating portion 116 mating with internal teeth of the clutch plate 104. In addition, the pressure-side mating portion 116 includes a run-off 117. The protruding tooth 110 extends over the run-off 117 of the pressure-side mating portion 116, as one of spline teeth forming the center-side mating portion 108.

14 Claims, 5 Drawing Sheets

(56) References Cited

U.S. PATENT DOCUMENTS

| | | | |
|---|---|---|---|
| 2009/0071789 A1 | 3/2009 | Kataoka et al. | |
| 2014/0235407 A1 | 8/2014 | Nonaka et al. | |
| 2014/0326570 A1 | 11/2014 | Isobe et al. | |
| 2015/0292567 A1* | 10/2015 | Kishimoto | F16D 13/648 192/70.11 |
| 2015/0337910 A1* | 11/2015 | Yoshimoto | F16D 43/12 192/70.27 |
| 2017/0159724 A1* | 6/2017 | Imanishi | F16D 43/216 |
| 2017/0184156 A1 | 6/2017 | Kataoka et al. | |
| 2018/0298957 A1* | 10/2018 | Kauffeldt | F16D 25/12 |

FOREIGN PATENT DOCUMENTS

| | | |
|---|---|---|
| JP | 2009-063023 A | 3/2009 |
| JP | 2009-068577 A | 4/2009 |
| JP | 2010-236653 A | 10/2010 |
| JP | 2013-096421 A | 5/2013 |
| WO | 2013/100130 A1 | 7/2013 |
| WO | 2016/024557 A1 | 2/2016 |

OTHER PUBLICATIONS

Extended European Search Report (EESR) dated Feb. 10, 2021 issued in the corresponding European Patent Application No. 18810063.0.

Indian Office Action dated Jul. 16, 2021 for the corresponding Indian Patent Application No. 201917049012.

* cited by examiner

CLUTCH DEVICE

TECHNICAL FIELD

The present invention relates to a clutch apparatus that transmits and shuts off the rotary drive power of a driving shaft that is rotationally driven by a motor to a driven shaft that drives a driven member.

BACKGROUND ART

In vehicles such as two-wheeled vehicles and four-wheeled vehicles, a clutch apparatus is conventionally placed between a motor such as an engine and a driven member such as a wheel. The clutch apparatus is used to transmit and shut off the rotary drive power of the motor to the driven member. In the clutch apparatus, a plurality of friction plates that are rotated by the rotary drive power of the motor and a plurality of clutch plates that are coupled to the driven member are generally placed, facing each other. In addition, these friction plates and clutch plates are brought into intimate contact with and separated from each other and accordingly the transmission and shutting-off of the rotary drive power can be freely carried out.

For example, according to Patent Literature 1 described below, projections and recesses that are fitted with each other are provided on end surfaces of splined portions, which hold the clutch plates, of a clutch center and a pressure plate, which come closer to or are separated from each other A clutch apparatus is disclosed which can therefore prevent the clutch plate from falling off when the clutch center and the pressure center move away from each other.

CITATION LIST

Patent Literature

Patent Document 1: JP-A-2010-236653

However, in the clutch apparatus described above in Patent Literature 1, the entire end surfaces of the splined portions, which hold the clutch plates, of the clutch center and the pressure plate are intermittently formed into a projection or a recess along the circumferential direction. Hence, upon transmission of power, stress tends to be concentrated on a boundary portion between the projection and the recess. Hence, there arises a problem that it is difficult to maintain strength.

The present invention deals with the above problem. In other words, an object of the present invention is to provide a clutch apparatus that includes a center clutch corresponding to a clutch center, and a pressure clutch corresponding to a pressure plate, and can hold a clutch plate without falling off of the clutch plate and also prevent a reduction in strength.

SUMMARY OF THE INVENTION

To attain the above object, the characteristics of the present invention includes a clutch apparatus that transmits and shuts off rotary drive power of a driving shaft to a driven shaft, the clutch apparatus including: a plurality of clutch plates being ring shaped-flat plates placed facing a plurality of friction plates that are rotationally driven by rotary drive of the driving shaft, the plurality of clutch plates including internal teeth on inner peripheral portions of the flat plates; a center clutch coupled to the driven shaft, the center clutch including external teeth mating with the internal teeth of the clutch plate; and a pressure clutch including external teeth mating with the internal teeth of the clutch plate, the pressure clutch being configured to be placed adjacent to the center clutch in such a manner as to be displaceable in directions coming closer to and being separated from the center clutch, and press the friction plate or the clutch plate, wherein in the center clutch and the pressure clutch, each end surface facing each other is formed flat without protrusions or indentations, each of the external teeth is formed on the same tip circle as each other, and included are: a protruding tooth extending as at least one of the external teeth of one of the clutches in such a manner as to overhang the external tooth of the other clutch; and a run-off configured to prevent physical interference with the protruding tooth on the external tooth of the other clutch toward which the protruding tooth extends.

According to the features of the present invention having such a configuration, in the clutch apparatus, the end surfaces, which face each other, of the center clutch and the pressure clutch, which hold the clutch plates are formed flat without protrusions or indentations. Hence, local stress concentration can be avoided upon transmission of power. As a result, a reduction in strength can be prevented. Moreover, the clutch apparatus according to the present invention includes the protruding tooth that extends as at least one of the external teeth of one of the clutches in such a manner as to overhang the external tooth of the other clutch. In addition, the run-off that does not interfere physically with the protruding tooth is included on the external tooth of the other clutch toward which the protruding tooth extends. Hence, it is possible to prevent the clutch plate from falling off when the center clutch and the pressure clutch move away from each other. In this case, preferably, the run-off is formed on the external tooth of the other toward which the protruding tooth extends with the same height as a bottom land of the external tooth, in other words, on or below a virtual extension surface of the surface of the bottom land.

Furthermore, the present invention has other characteristics where the center clutch and the pressure clutch include a cam mechanism having a pair of cam surfaces, the pair of cam surfaces brings the pressure clutch closer to or separate the pressure clutch from the center clutch to reinforce or reduce a pressing force of the pressure clutch on the friction plate or the clutch plate upon the center clutch and the pressure clutch rotating relatively to each other, and the run-off is connected directly to a bottom land adjacent to the run-off in a circumferential direction.

According to the other features of the present invention having such a configuration, in the clutch apparatus, the center clutch and the pressure clutch have the cam mechanism. In addition, the run-off is formed, connected directly to the adjacent bottom lands. Hence, it is possible to smoothly bring the center clutch and the pressure clutch closer to each other or separate them from each other while avoiding physical interference from the protruding tooth, when the center clutch and the pressure clutch are brought closer to or separated from each other while rotating relatively to each other.

Moreover, according to the other features of the present invention, in the clutch apparatus, the protruding tooth is formed in such a manner as to be adjacent to the cum surface formed on the center clutch or pressure clutch.

According to the other features of the present invention having such a configuration, in the clutch apparatus, the protruding tooth is formed in such a manner as to be adjacent to the cam surface formed on the center clutch or pressure clutch. Hence, the protruding tooth is formed around a portion to which a high rigidity is given by the formation of the cam surface. Consequently, the strength of the protruding tooth can be increased.

Moreover, according to the other features of the present invention, in the clutch apparatus, the run-off is formed over the entire area of the external tooth in a face width direction thereof.

According to the other features of the present invention having such a configuration, the run-off is formed over the entire area of the external tooth in the face width direction. Hence, the clutch apparatus can prevent physical interference with the clutch plate when the center clutch and the pressure clutch are separated, and the holding of the clutch plate when the center clutch and the pressure clutch come closer to each other. Consequently, it is possible to make operability smooth in the separation and approach of the center clutch and the pressure clutch.

Moreover, according to the other features of the present invention, in the clutch apparatus, the protruding tooth is formed on the center clutch or the pressure clutch, whichever holds more clutch plates.

According to the other features of the present invention having such a configuration, the protruding tooth is formed on the center clutch or the pressure clutch, whichever holds more clutch plates. Hence, the clutch apparatus can increase the rigidity of the center clutch or pressure clutch, whichever has a greater transmission torque, by causing it to hold many clutch plates. Consequently, it is possible to stably transmit the drive power. In this case, the run-off is formed on the center clutch or the pressure clutch, whichever holds fewer clutch plates. However, transmission torque of the center clutch or pressure clutch holding fewer clutch plates is small. Hence, it is possible to stably transmit the drive power.

The present invention still further has characteristics where the center clutch or the pressure clutch where the protruding tooth is formed is formed in such a manner that bottom lands on both sides of the protruding tooth in a circumferential direction are recessed inward with respect to a root circle of the external teeth where the protruding tooth is formed.

According to the other features of the present invention having such a configuration, the clutch apparatus is formed in such a manner that the bottom lands on both sides in the circumferential direction of the protruding tooth of the center clutch or pressure clutch where the protruding tooth is formed are recessed inward with respect to the root circle of the external teeth where the protruding tooth is formed. Hence, it is possible to easily form the protruding tooth thick if the protruding tooth is formed by casting or cutting. Consequently, the strength of the protruding tooth can be increased.

DESCRIPTION OF THE EMBODIMENTS

Figure 1:
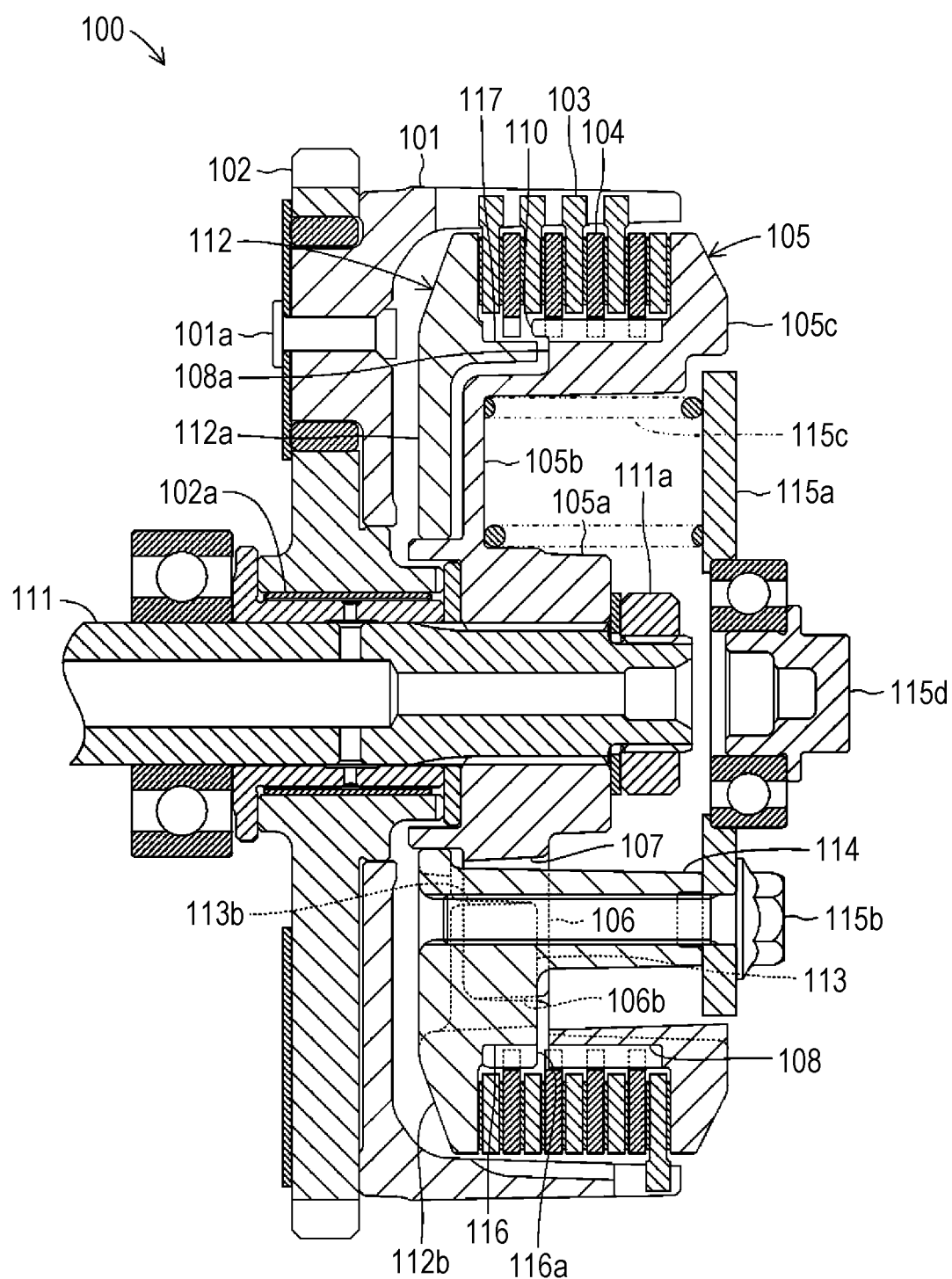
FIG. 1 is a cross-sectional view illustrating a schematic of the entire configuration of a clutch apparatus according to one embodiment of the present invention.

One embodiment of a clutch apparatus according to the present invention is described hereinafter with reference to the drawings. FIG. 1 is a cross-sectional view illustrating a schematic of the entire configuration of a clutch apparatus 100 according to the present invention. In each drawing referred to in the description, part of constituent elements is schematically exaggerated and displayed to facilitate an understanding of the present invention. Hence, the dimension ratio between each constituent element, and the like may be different. The clutch apparatus 100 is a mechanical apparatus for transmitting and shutting off the drive power of an engine (not illustrated) as a motor of a two-Wheeled vehicle (motorcycle) to a wheel (not illustrated) as a driven member. The clutch apparatus 100 is placed between the engine and a transmission (transmission) (not illustrated).
(Configuration of Clutch Apparatus 100)

The clutch apparatus 100 includes a clutch housing 101. The clutch housing 101 is a component for holding friction plates 103 and transmitting the drive power from the engine to the friction plates 103. The clutch housing 101 includes an aluminum alloy member formed into a bottomed cylindrical shape. More specifically, a spline of an internal gear shape is formed on the tubular portion of the clutch housing 101. A plurality of (five in the embodiment) the friction plates 103 is spline fitted with and held by the spline in such a manner as to be displaceable along an axial direction of the clutch housing 101 and rotatable together with the clutch housing 101.

The illustrated left side surface of the clutch housing 101 is mounted on an input gear 102 with a rivet 101a via a torque damper (not illustrated). The input gear 102 is a gear component that is rotationally driven, meshing with an unillustrated drive gear that is rotationally driven by the drive of the engine. The input gear 102 is rotatably supported by a shaft 111 described below via a bearing 102a. In other words, the clutch housing 101 is rotationally driven together with the input gear 102, independently of the shaft 111, at a position concentric with the shaft 111.

The friction plate 103 is a flat ring-shaped component that is pressed against a clutch plate 104. The friction plate 103 is formed by punching a thin flat plate member of an aluminum material into a ring shape. In the configuration of both side surfaces (front and back sides) of the friction plate 103, unillustrated friction materials being a plurality of pieces of paper are bonded. In addition, an unillustrated oil groove is formed between the friction materials. Moreover, each friction plate 103 is formed with the same size and shape.

In the clutch housing 101, a plurality of (four in the embodiment) the clutch plates 104 is sandwiched between the friction plates 103, and is held by a center clutch 105 and a pressure clutch 112.

The clutch plate 104 is a flat ring-shaped component that is pressed against the friction plate 103. The clutch plate 104 is formed by punching a thin plate member of an SPCC (steel plate cold commercial) material into a ring shape.

Unillustrated oil grooves with a depth of several µm to several ten µm for holding clutch oil are formed on both side surfaces (front and back sides) of the clutch plate 104. In addition, the surface hardening treatment is performed on each clutch plate 104 for the purpose of improving wear resistance.

Moreover, a spline of an internal gear shape that is spline fitted with a center-side mating portion 108 formed on the center clutch 105 and a pressure-side mating portion 116 formed on the pressure clutch 112 is formed on an inner peripheral portion of each clutch plate 104. Each of the clutch plates 104 is formed with the same size and shape. The friction material may be provided on the clutch plate 104 instead of the friction plate 103.

Figure 2:
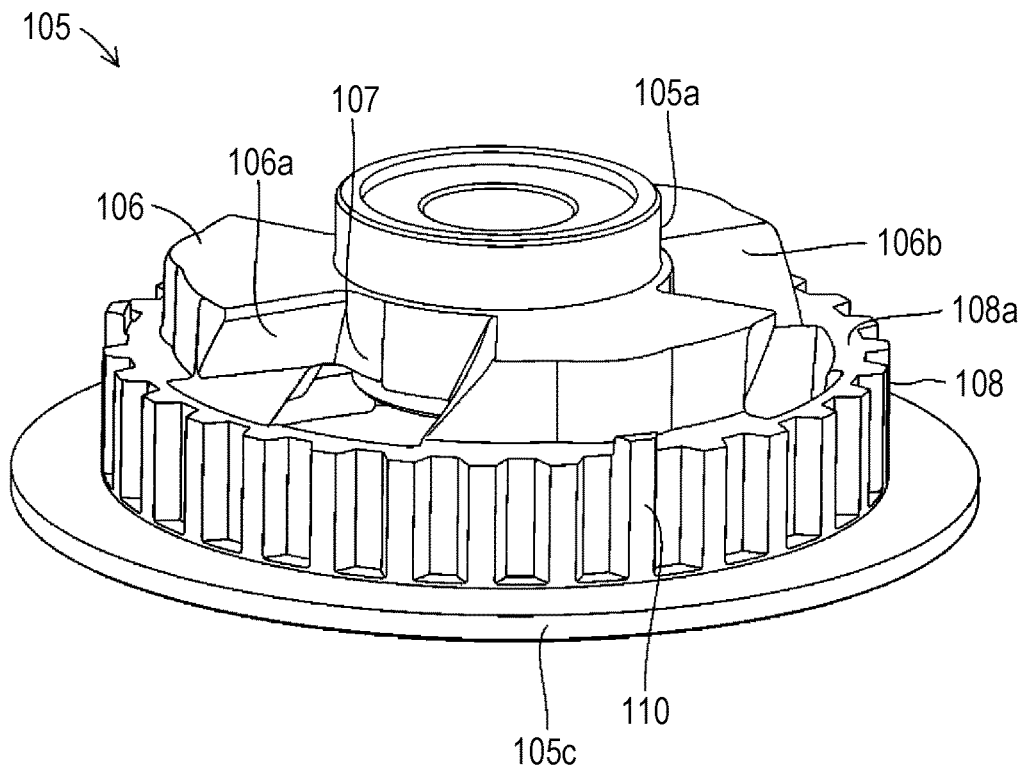
FIG. 2 is a perspective view schematically illustrating the external configuration of a center clutch integrated into the clutch apparatus illustrated in FIG. 1.

As illustrated in FIG. 2, the center clutch 105 is a component that holds the clutch plates 104 and the pressure clutch 112. In addition, the center clutch 105 transmits the drive power of the engine to the transmission side. The center clutch 105 includes an aluminum alloy member formed into a substantially cylindrical shape. More specifically, the center clutch 105 mainly includes a connected portion 105a, a middle portion 105b, and a plate holding portion 105c, which are integrally formed.

The connected portion 105a is a portion that is connected to the shaft 111, holding the pressure clutch 112. The connected portion 105a, is formed into a cylindrical shape. A spline of an internal gear shape is formed along an axial direction of the center clutch 105 on an inner peripheral surface of the connected portion 105a. The spline is spline fitted with the shaft 111. In other words, the center clutch 105 rotates together with the shaft 111 at the position concentric with the clutch housing 101 and the shaft 111.

The middle portion 105b is a portion formed between the connected portion 105a and the plate holding portion 105c. The middle portion 105b is configured in such a manner that three support through-holes 107 are formed respectively between three center-side cam portions 106 placed in a circumferential manner. The three center-side cam portions 106 are protruding portions forming a center-side assist cam surface 106a and a center-side slipper cam surface 106b. The center-side cam portion 106 is formed in such a manner as to extend along a circumferential direction of the center clutch 105. In this case, the three center-side cam portions 106 are formed equally along the circumferential direction of the center clutch 105. The center-side assist cam surface 106a and the center-side slipper cam surface 106b are formed respectively at both end portions of the center clutch 105 of the center-side cam portion 106 in the circumferential direction.

Each center-side assist cam surface 106a is a portion for generating assistance power that reinforces a pressing force between the friction plate 103 and the clutch plate 104 in cooperation with a pressure-side assist cam surface 113a described below. Each center-side assist cam surface 106a includes an inclined surface projecting gradually toward the pressure clutch 112 along the circumferential direction of the center clutch 105.

Each center-side slipper cam surface 106b is a portion for separating the friction plate 103 and the clutch plate 104 at an early stage and causing the clutch apparatus to transition to a clutch slipping state in corporation with a pressure-side slipper cam surface 113b describe below. Each center-side slipper cam surface 106b includes an inclined surface inclined in the same direction as the center-side assist cam surface 106a on a side opposite to the center-side assist cam surface 106a along the circumferential direction. Here, the clutch slipping state is an incomplete transmission state where only part of the engine drive power is transmitted to a drive wheel side before the friction plates 103 and the clutch plates 104 of the clutch apparatus 100 come perfectly into intimate contact with each other.

The three support through-holes 107 are through-holes for allowing three tubular columns 114 described below to penetrate therethrough, respectively. The three support through-holes 107 are formed equally at positions between the three center-side cam portions 106 along the circumferential direction of the center clutch 105.

The plate holding portion 105c is a portion that holds part of the plurality of the clutch plates 104. The plate holding portion 105c is formed into a cylindrical shape. In addition, the plate holding portion 105c is formed in such a manner that an end of the portion formed into a cylindrical shape projects in flange form. The center-side mating portion 108 is formed on an outer peripheral surface of the portion, which is formed into a cylindrical shape, of the plate holding portion 105c.

The center-side mating portion 108 is a portion that holds the clutch plates 104 sandwiching the friction plates 103 in such a manner as to be capable of displacing the clutch plates 104 along the axial direction of the center clutch 105 and rotating the clutch plates 104 together with the center clutch 105. The center-side mating portion 108 includes a spline of an external gear shape. Moreover, a protruding tooth 110 is formed on part of the spline forming the center-side mating portion 108. In addition, a portion except the protruding tooth 110 of a center-side end surface 108a facing the pressure-side mating portion 116 described below, that is, a portion inward with respect to the spline teeth, is formed flat without protrusions or indentations.

Figure 3:
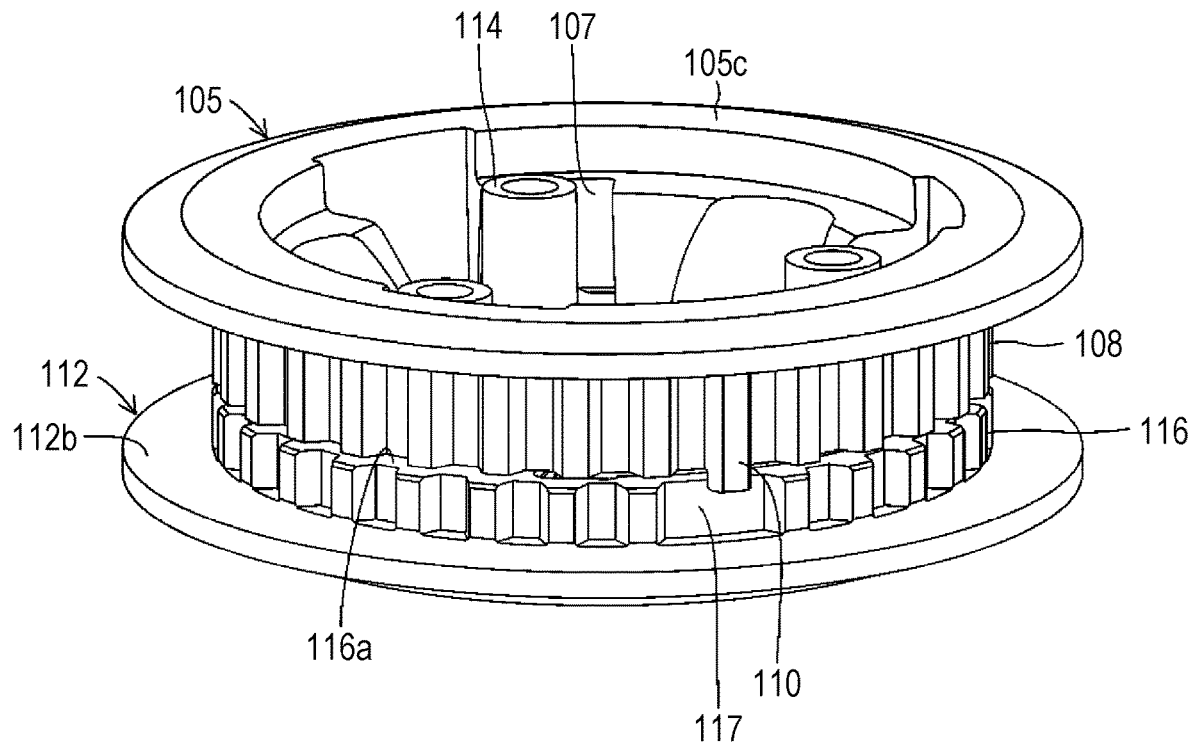
FIG. 3 is a perspective view schematically illustrating the external configuration of the center clutch illustrated in FIG. 2 and a pressure clutch illustrated in FIG. 4, which are assembled.

As illustrated in FIG. 3, the protruding tooth 110 is a portion for preventing the clutch plate 104 and/or the friction plate 103 from falling off. One of the spline teeth forming the center-side mating portion 108 extends to a length that reaches over a run-off 117 of the pressure-side mating portion 116 of the pressure clutch 112 to form the protruding tooth 110. The protruding tooth 110 is formed at a position adjacent to each of the three center-side cam portions 106 outward in a radial direction of the center clutch 105. In other words, three protruding teeth 110 are provided, placed equally, along the circumferential direction of the center clutch 105.

The shaft 111 is a shaft formed into a hollow shape. One end (left in the drawing) side rotatably supports the input gear 102 and the clutch housing 101 via the cylindrical bearing 102a. In addition, the center clutch 105 that is spline fitted is fixedly supported via a nut 111a. The other end (right in the drawing) of the shaft 111 is coupled to an unillustrated transmission of a two-wheeled vehicle. In other words, the shaft 111 corresponds to a driven shaft in the present invention.

Figure 4:
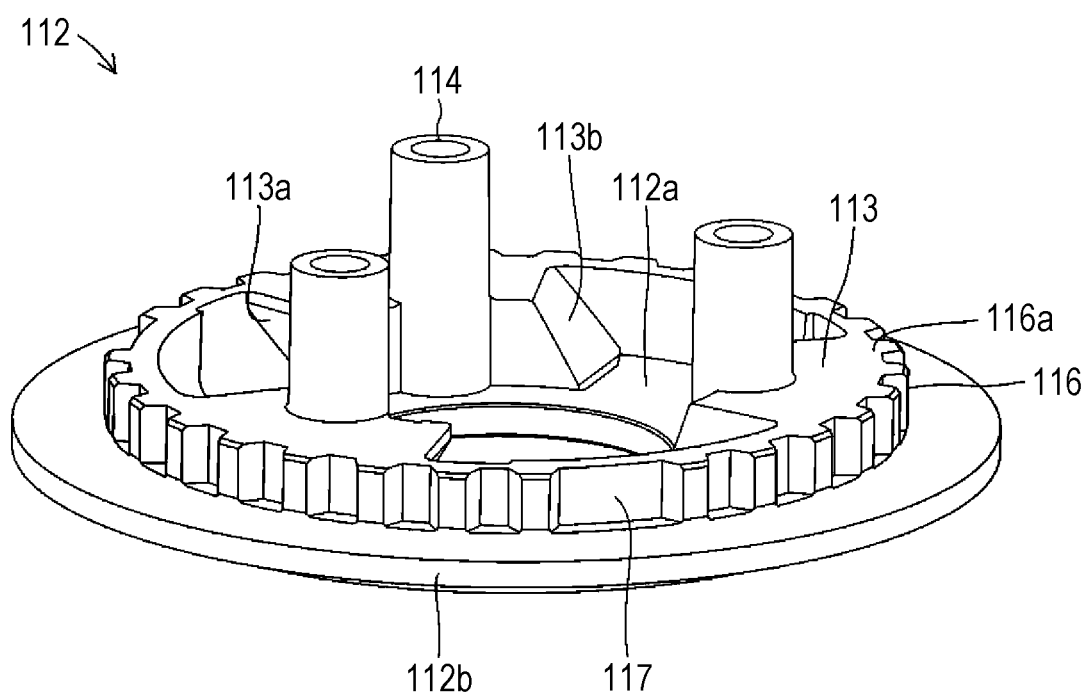
FIG. 4 is a perspective view schematically illustrating the external configuration of the pressure clutch integrated into the clutch apparatus illustrated in FIG. 1.

As illustrated in FIG. 1, the pressure clutch 112 is a component for pressing the friction plate 103 and bringing the friction plate 103 and the clutch plate 104 into intimate contact with each other. The pressure clutch 112 includes an aluminum alloy member formed into a substantially disc shape with substantially the same outer diameter as the outer diameter of the clutch plate 104. More specifically, as illustrated in FIG. 4, the pressure clutch 112 mainly includes an inner disc portion 112a and a plate holding portion 112b, which are formed integrally.

The inner disc portion 112a includes the three tubular columns 114 respectively between three pressure-side cam portions 113 placed in a circumferential manner. Consequently, the inner disc portion 112a is slidably fitted onto an external peripheral surface of the connected portion 105a of the center clutch 105. In other words, the pressure clutch 112 is rotatably provided, independently of the center clutch 105 and the shaft 111, at the position concentric with the clutch housing 101, the center clutch 105, and the shaft 111.

The three pressure-side cam portions 113 are protruding portions that delimit the pressure-side assist cam surface 113a and the pressure-side slipper cam surface 113b. The pressure-side cam portion 113 is formed in such a manner as to extend along a circumferential direction of the pressure clutch 112. In this case, the three pressure-side cam portions 113 are formed at equal spacings along the circumferential direction of the pressure clutch 112. Both end portions of the pressure-side cam portion 113 in the circumferential direction of the pressure clutch 112 delimit the pressure-side assist cam surface 113a and the pressure-side slipper cam surface 113b, respectively.

Each pressure-side assist cam surface 113a is a portion that slides over the center-side assist cam surface 106a of the center clutch 105. The pressure-side assist cam surface 113a includes an inclined surface that projects gradually toward the center clutch 105 along the circumferential direction of the pressure clutch 112. In other words, the center-side assist cam surface 106a and the pressure-side assist cam surface 113a form an assist mechanism. The assistance power generated by the assist mechanism allows using clutch springs 115c with a low capacity (modulus of elasticity).

Each pressure-side slipper cam surface 113b is a portion that slides over the center-side slipper cam surface 106b. Each pressure-side slipper cam surface 113b includes an inclined surface that extends in the same direction as the pressure-side assist cam surface 113a on a side opposite to the pressure-side assist cam surface 113a along the circumferential direction, in other words, the center-side slipper cam surface 106b and the pressure-side slipper cam surface 113b form a slipper mechanism.

The three tubular columns 114 are cylindrical portions extending in a columnar shape in the axial direction of the center clutch 105 to support a lifter plate 115a. A female screw that is threadedly engaged with a mounting bolt 115b is formed on an inner peripheral portion of the tubular column 114. The three tubular columns 114 are formed at equal spacings along the circumferential direction of the pressure clutch 112.

The lifter plate 115a is a component for sandwiching the clutch springs 115c in corporation with the middle portion 105b of the center clutch 105. The lifter plate 115a includes a metal plate shaped member. A release pin 115d is provided via a bearing at a center portion of the lifter plate 115a.

The clutch spring 115c is an elastic member for pressing the pressure clutch 112 toward the center clutch 105 and pressing the plate holding portion 112b of the pressure clutch 112 against the friction plate 103. The clutch spring 115c includes a coil spring of a spring steel wound in a helical fashion. The clutch springs 115c are placed respectively between the three tubular columns 114.

The release pin 115d is a rod-like component for pressing the lifter plate 115a when the transmission state of the rotary drive power of the clutch apparatus 100 is put into a shut-off state. One end (right side in the drawing) portion of the release pin 115d is connected to an unillustrated clutch release mechanism. Here, the clutch release mechanism is a mechanical device that presses the release pin 115d toward the shaft 111 by the operation of a clutch operating lever (not illustrated) by a driver of a motor vehicle where the clutch apparatus 100 is mounted.

The plate holding portion 112b is a portion that holds the other part of the plurality of the clutch plates 104. The clutch spring 115c is formed into a cylindrical shape. In addition, the clutch spring 115c is formed in such a manner that an end portion of the portion formed into a cylindrical shape projects in flange form. The pressure-side mating portion 116 is formed on an outer peripheral surface of the portion, which is formed into a cylindrical shape, of the plate holding portion 112b.

The pressure-side mating portion 116 is a portion that holds the clutch plate 104 sandwiching the friction plate 103 in such a manner as to be capable of displacing the clutch plate 104 along the axial direction of the pressure clutch 112 and rotating the clutch plate 104 together with the pressure clutch 112. The pressure-side mating portion 116 includes a spline of an external gear shape.

In this case, the spline forming the pressure-side mating portion 116 is formed with the same tip circle, root circle, and tooth thickness as those of the spline forming the center-side mating portion 108. In addition, the spline forming the pressure-side mating portion 116 is formed with a shorter face width than that of the spline teeth forming the center-side mating portion 108. Moreover, a pressure-side end surface 116a, which faces the center-side mating portion 108, of the pressure-side mating portion 116 is formed flat without protrusions or indentations. In addition, the run-off 117 is formed on part of the spline forming the pressure-side mating portion 116.

The run-off 117 is a portion for preventing physical interference from the protruding tooth 110. One of the spline teeth forming the pressure-side mating portion 116 is omitted in the run-off 117 being a curved surface. More specifically, one spline tooth on the pressure-side mating portion 116 where the protruding tooth 110 is located is omitted in the run-off 117. In addition, the run-off 117 is formed by a flat arc surface without protrusions or indentations, which is connected directly to two bottom lands adjacent on both sides of the omitted spline tooth in a circumferential direction thereof in such a manner as to be level with the bottom lands. Therefore, the run-offs 117 are formed in such a manner as to be placed at equal spacings along the circumferential direction of the pressure clutch 112, corresponding to the three protruding teeth 110.

A predetermined amount of clutch oil (not illustrated) is filled in the clutch apparatus 100. The clutch oil is mainly supplied to between the friction plate 103 and the clutch plate 104, and absorbs frictional heat generated between the plates, and prevents the wear of the friction material. In other words, the clutch apparatus 100 is what is called a wet multi-plate friction clutch apparatus.

(Operation of Clutch Apparatus 100)

Next, the operation of the clutch apparatus 100 configured as described above is described. The clutch apparatus 100 is placed between the engine and the transmission in the vehicle as described above. The clutch apparatus 100 transmits and shuts off the drive power of the engine to the transmission by the operation of the clutch operating lever by a driver of the vehicle.

Specifically, as illustrated in FIG. 1, in the clutch apparatus 100, if the driver (not illustrated) of the vehicle does not operate the clutch operating lever (not illustrated), the clutch release mechanism (not illustrated) does not press the release pin 115d. Hence, the pressure clutch 112 presses the friction plate 103 with the elastic force of the clutch springs 115c. Consequently, in the center clutch 105, the friction plates 103 and the clutch plates 104 are in a state of being pressed against each other and friction coupled. The shaft 111 is then rotationally driven. In other words, the rotary drive power of the motor transmitted to the center clutch 105 allows the shaft 111 to be rotationally driven. In this case, the pressure clutch 112 is pressed by the assist mechanism against the center clutch 105 with a strong force.

In such a clutch ON state, the protruding teeth 110 formed on the plate holding portion 105c of the center clutch 105 are located over the run-offs 117 formed on the pressure-side mating portion 116 of the pressure clutch 112, coinciding with each other. Hence, the protruding teeth 110 prevent the friction plate 103 and/or the clutch plate 104 existing on the boundary portion between the center-side mating portion 108 and the pressure-side mating portion 116 from falling off the plate holding portions 105c and/or 112b.

Moreover, in the clutch ON state, if the rotational speed on the drive wheel side exceeds the rotational speed on the engine side on the basis of the downshifting operation on the transmission by the driver, the rotational speed of the shaft 111 may exceed the rotational speed of the input gear 102. Back torque may work on the clutch apparatus 100. In this case, the pressure-side slipper cam surface 113b formed on the pressure clutch 112 rides over the center-side slipper cam surface 106b formed on the center clutch 105. The cam operation allows the pressure clutch 112 to be displaced in a direction away from the center clutch 105 while rotating relatively to the center clutch 105. The slipper function works to suddenly reduce the pressing force.

If the slipper function woks, the protruding teeth 110 are rotationally displaced relatively to the pressure clutch 112. However, the run-offs 117 are formed on the pressure-side mating portion 116 of the pressure clutch 112 in such a manner as to be level with and integrally connected to their adjacent bottom lands. Hence, the protruding teeth 110 do not cause physical interference such as a collision with the spline teeth forming the pressure-side mating portion 116.

Figure 5:
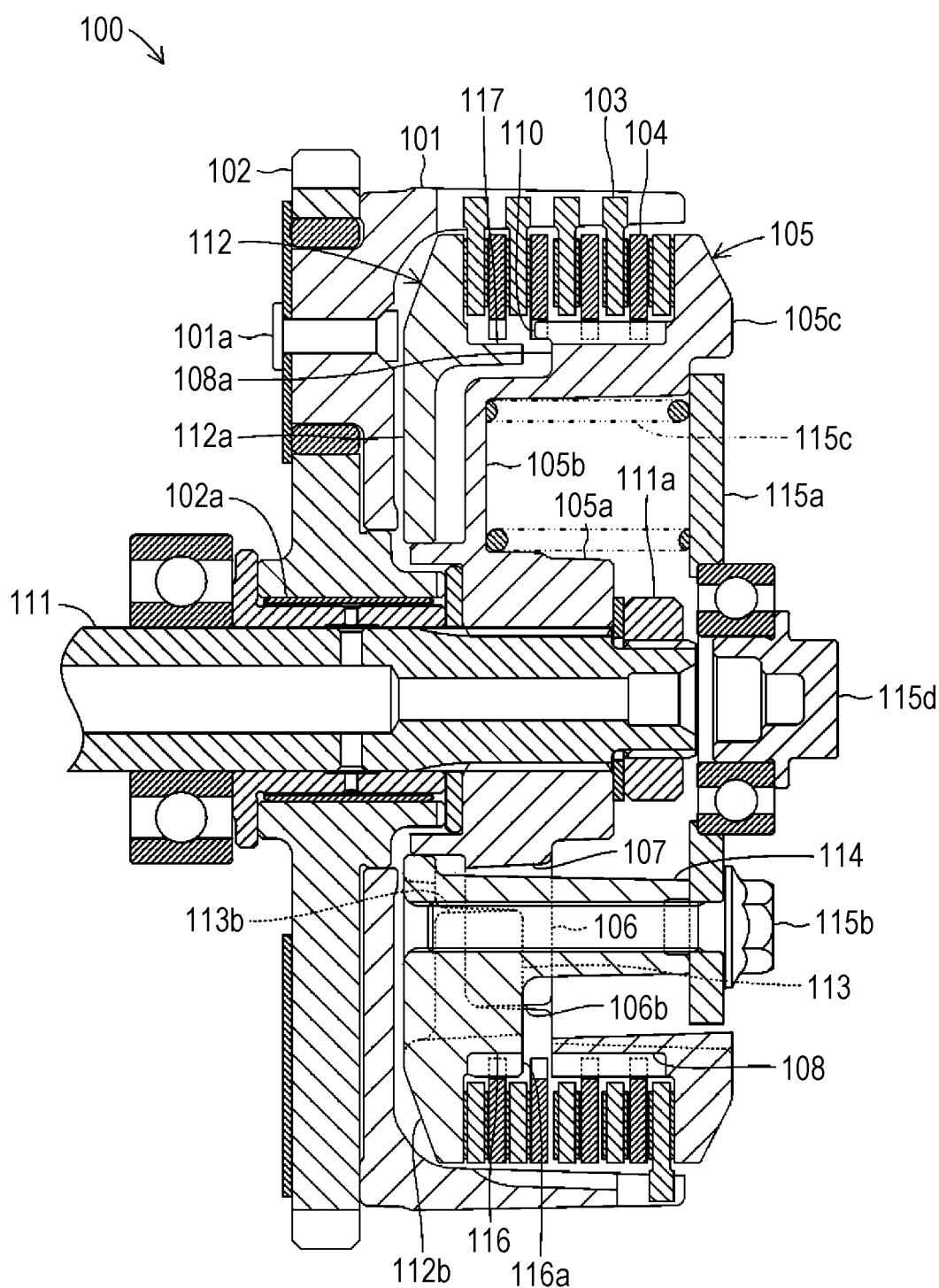
FIG. 5 is a cross-sectional view illustrating the clutch apparatus illustrated in FIG. 1 of when the clutch is OFF.

On the other hand, as illustrated in FIG. 5, in the clutch apparatus 100, if the driver of the vehicle operates the clutch operating lever, the clutch release mechanism (not illustrated) presses the release pin 115d. Hence, the pressure clutch 112 is displaced in the direction away from the center clutch 105 against the elastic force of the clutch springs 115c. Consequently, the center clutch 105 is in a state where the friction coupling between the friction plates 103 and the clutch plates 104 has been released. Hence, the center clutch 105 is in a state where the rotary drive is attenuated, or stopped. In other words, the rotary drive power of the motor is shut off from the center clutch 105.

In the clutch OFF state, the protruding teeth 110 formed on the plate holding portion 105c of the center clutch 105 are located at separated positions that do not coincide with the run-offs 117 formed on the pressure-side mating portion 116 of the pressure clutch 112 in a space between the center-side end surface 108a of the center-side mating portion 108 and the pressure-side end surface 116a of the pressure-side mating portion 116. Hence, the protruding teeth 110 prevent the friction plate 103 and/or the clutch plate 104 existing on the boundary portion between the center-side mating portion 108 and the pressure-side mating portion 116 from falling off the plate holding portions 105c and/or 112b.

Even if the clutch apparatus 100 subsequently transitions again to the clutch ON state on the basis of the operation of the clutch operating lever by the driver of the vehicle, the protruding teeth 110 do not interfere physically with the pressure-side mating portion 116. In addition, the protruding teeth 110 prevent the friction plate 103 and/or the clutch plate 104 existing on the boundary portion between the center-side mating portion 108 and the pressure-side mating portion 116 from falling off the plate holding portions 105c and/or 112b.

As can be seen from the above description of the operation, according to the embodiment, in the clutch apparatus 100, the clutch plates 104 are held by the center clutch 105 and the pressure clutch 112. The center-side end surface 108a of the center clutch 105 and the pressure-side end surface 116a of the pressure clutch 112 face each other, and both of them are formed flat without protrusions or indentations. Hence, a reduction in strength can be prevented by avoiding local stress concentration upon transmission of power. Moreover, the clutch apparatus 100 according to the present invention includes the protruding tooth 110 being at least one of the teeth of the spline forming the center-side mating portion 108 of the center clutch 105, the protruding tooth 110 extending, overhanging the spline forming the pressure-side mating portion 116 of the pressure clutch 112, and the run-off 117 with the same height as the bottom land of the pressure-side mating portion 116 on the pressure-side mating portion 116 toward which the protruding tooth 110 extends. Hence, it is possible to prevent the clutch plate 104 from falling off when the center clutch 105 and the pressure clutch 112 are separated from each other.

Furthermore, the implementation of the present invention is not limited to the above embodiment. Various modifications can be made as long as they do not depart from the object of the present invention. In each modification presented below, the same reference numerals as those assigned to the clutch apparatus 100 are assigned to constituent portions similar to those of the clutch apparatus 100 in the above embodiment. Descriptions thereof are omitted.

For example, in the above embodiment, the spline forming the pressure-side mating portion 116 is formed in such a manner as to have the same tip circle, root circle, and tooth thickness as the spline forming the center-side mating portion 108. In addition, the spline forming the pressure-side mating portion 116 is formed in such a manner as to have a shorter face width than the spline teeth forming the center-side mating portion 108. However, the spline forming the center-side mating portion 108 and the spline forming the pressure-side mating portion 116 are simply required to be formed in such a manner as to have at least the same tip circle and be placed facing each other. Consequently, all the plurality of the clutch plates 104 can be configured in such a manner as to have the same size and shape. On the other hand, for example, the spline forming the pressure-side mating portion 116 can also be formed in such a manner as to have a smaller root circle or a greater tooth thickness than the spline forming the center-side mating portion 108.

Moreover, in the above embodiment, the three protruding teeth 110 are placed at equal spacings along the circumferential direction of the center-side mating portion 108. However, it is simply required to provide at least one protruding tooth 110 on the center-side mating portion 108 or the pressure-side mating portion 116. Furthermore, two, three, four, or more protruding teeth 110 may be provided.

Moreover, in the above embodiment, the protruding tooth 110 is formed on the center clutch 105 holding more clutch plates 104 between the center clutch 105 and the pressure clutch 112. In the above embodiment, the center clutch 105 holds three clutch plates 104. Consequently, the clutch apparatus 100 can increase the rigidity of the center clutch 105 having a greater transmission torque by causing the center clutch 105 holding many clutch plates 104. Consequently, the clutch apparatus 100 can transmit drive power steadily. However, naturally, the protruding tooth 110 may be formed on the pressure clutch 112 holding fewer clutch plates 104 between the center clutch 105 and the pressure clutch 112. In this case, the run-off 117 is formed on the center clutch 105.

Moreover, in the above embodiment, the protruding tooth 110 is formed in such a manner as to have a length overlapping the pressure-side mating portion 116 of the pressure clutch 112. However, the protruding tooth 110 is simply required to be formed in such a manner as to have at least a length that reaches the pressure-side end surface 116*a* of the pressure-side mating portion 116.

Moreover, in the above embodiment, the protruding tooth 110 is formed at the position adjacent to each of the three center-side cam portions 106 outward in the radial direction of the center clutch 105. Consequently, the clutch apparatus 100 is formed around the portion to which a high rigidity is given by the formation of the center-side cam portion 106, Consequently, the strength of the protruding tooth 110 can be increased. However, the protruding tooth 110 may be formed in a place other than the position adjacent to the center-side cam portion 106 in the circumferential direction of the center-side mating portion 108. For example, the protruding tooth 110 may be formed at a position adjacent to the center-side cam portion 106 outward in a radial direction of the support through-hole 107.

Figure 6:
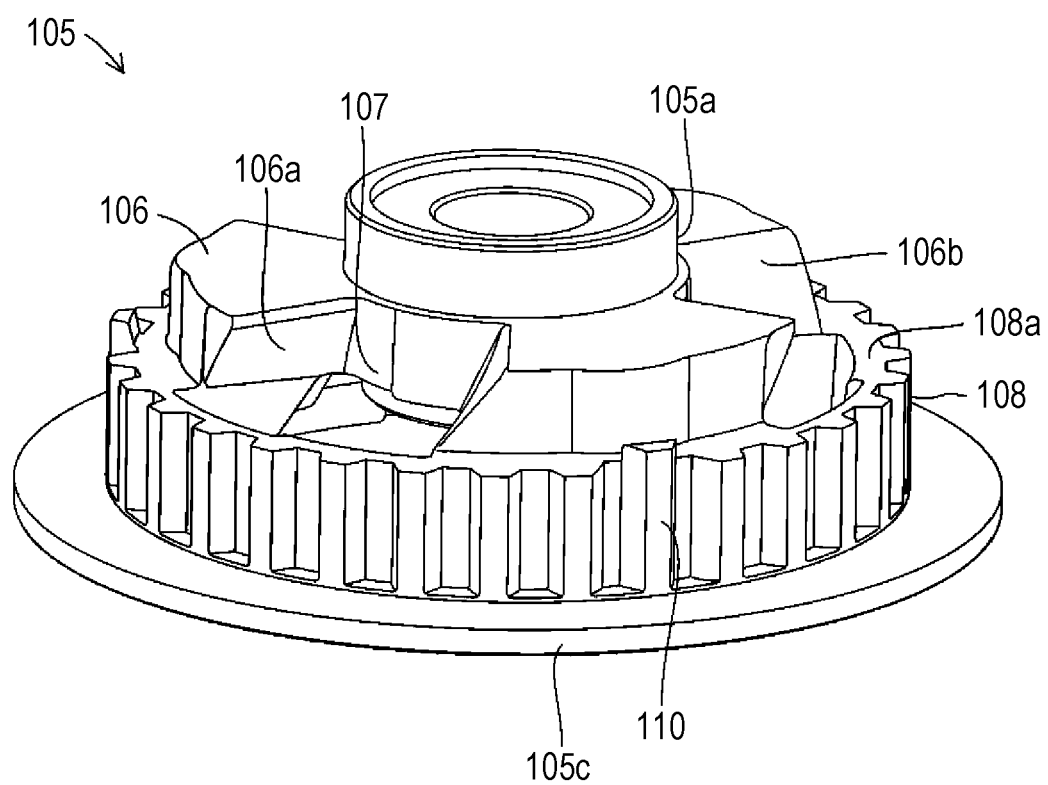
FIG. 6 is a perspective view schematically illustrating the external configuration of the center clutch according to a modification of the present invention.

Moreover, in the above embodiment, the center-side mating portion 108 is configured in such a manner as to have a constant root circle including the bottom lands on both sides of the protruding tooth 110 in the circumferential direction. However, as illustrated in FIG. 6, the center-side mating portion 108 may be formed in such a manner as to be recessed inward in the radial direction with respect to the bottom lands (bottom portions of the spline grooves) formed on both sides of the spline tooth other than the protruding tooth 110. According to this, the clutch apparatus 100 is formed in such a manner that the bottom lands on both sides of the protruding tooth 110 in the circumferential direction are recessed inward with respect to the root circle of the external teeth where the protruding tooth 110 is formed. Hence, if the protruding tooth 110 is formed by casting or cutting, the tooth can be easily formed thicker. Hence, the strength of the protruding tooth 110 can be increased.

Moreover, in the above embodiment, the run-off 117 is configured in such a manner as to be level with the bottom lands adjacent in the circumferential direction. However, the run-off 117 is simply required to be formed in such a manner as not to cause physical interference, such a collision or butting, with the protruding tooth 110. Hence, the run-off 117 is simply required to be formed in such a manner as to have a height equal to or less than the height of the bottom lands adjacent in the circumferential direction (in other words, in such a manner as to be level with or lower than a virtual extension surface of the bottom land).

Moreover, in the above embodiment, the run-off 117 is formed over the entire area, in the face width direction, of the spline tooth forming the pressure-side mating portion 116. Consequently, the clutch apparatus 100 can prevent physical interference from the clutch plate 104 when the center clutch 105 and the pressure clutch 112 are separated. Moreover, the clutch apparatus 100 can prevent the holding of the clutch plates 104 when the center clutch 105 and the pressure clutch 112 come closer to each other. Consequently, it is possible to make operability smooth in the separation and approach of the center clutch 105 and the pressure clutch 112. However, the run-off 117 is simply required to be formed in such a manner as not to interfere physically with the protruding tooth 100. Hence, the run-off 117 may be formed only on part in the face width of the spline tooth forming the pressure-side mating portion 116. In addition, the spline tooth may be formed on the other part in the face width.

Moreover, in the above embodiment, the clutch apparatus 100 is configured including the assist mechanism and the slipper mechanism. However, the clutch apparatus 100 may be configured without at least one of the assist mechanism and the slipper mechanism.

Moreover, in the above embodiment, the pressure clutch 112 is configured in such a manner as to press the friction plate 103. However, the pressure clutch 112 is simply required to be configured in such a manner as to press the friction plate 103 or the clutch plate 104, bringing the friction plate 103 and the clutch plate 104 into intimate contact with each other. In other words, the pressure clutch 112 may be configured in such a manner as to press the clutch plate 104. For example, the positions of the friction plate 103 and the clutch plate 104 in the above embodiment may be interchanged. It is also possible to configure the clutch apparatus 100 in such a manner that the pressure clutch 112 presses the clutch plate 104 in this manner.

LIST OF THE REFERENCE NUMERALS

100 Clutch apparatus
101 Clutch housing
101*a* Rivet
102 Input gear
102*a* Bearing
103 Friction plate
104 Clutch plate
105 Center clutch
105*a* Connected portion
105*b* Middle portion
105*c* Plate holding portion
106 Center-side cam portion
106*a* Center-side assist cam surface
106*b* Center-side slipper cam surface
107 Support through-hole
108 Center-side mating portion
108*a* Center-side end surface
110 Protruding tooth
111 Shaft
111*a* Nut
112 Pressure clutch
112*a* Inner disc portion
112*b* Plate holding portion
113 Pressure-side cam portion
113*a* Pressure-side assist cam surface
113*b* Pressure-side slipper cam surface
114 Tubular column
115*a* Lifter plate
115*b* Mounting bolt
115*c* Clutch spring
115*d* Release pin
116 Pressure-side mating portion
116*a* Pressure-side end surface
117 Run-off

The invention claimed is:

1. A clutch apparatus that transmits and shuts off rotary drive power of a driving shaft to a driven shaft, the clutch apparatus comprising:
a plurality of clutch plates being ring shaped-flat plates placed facing a plurality of friction plates that are rotationally driven by rotary drive of the driving shaft, the plurality of clutch plates including internal teeth on inner peripheral portions of the flat plates;

a center clutch coupled to the driven shaft, the center clutch including external teeth mating with the internal teeth of part of the plurality of clutch plates; and a pressure clutch including external teeth mating with the internal teeth of other part of the plurality of clutch plates, the pressure clutch being configured to be placed adjacent to the center clutch in such a manner as to be displaceable in directions coming closer to and being separated from the center clutch, and press one of the plurality of friction plates or one of the plurality of clutch plates, wherein in the center clutch and the pressure clutch,
  each end surface facing each other is formed flat without protrusions or indentations, and
  each of the external teeth is formed on the same tip circle as each other,
one of the center clutch or the pressure clutch comprises a run-off formed by omitting at least one of the external teeth of the one of the center clutch or the pressure clutch, the run-off being a smooth arc surface which is connected directly to two bottom lands of two of the external teeth of the one of the center clutch or the pressure clutch adjacent to the run-off in a circumferential direction of the run-off in such a manner as to be level with the two bottom lands,
other one of the center clutch or the pressure clutch comprises a protruding tooth which is at least one of the external teeth of the other one of the center clutch or the pressure clutch, the protruding tooth extending in such a manner as to overhang the run-off, and
the protruding tooth does not interfere with the two of the external teeth of the one of the center clutch or the pressure clutch adjacent to the run-off, when the center clutch and the pressure clutch are rotationally displaced relative to each other.

2. The clutch apparatus according to claim 1, wherein
the center clutch and the pressure clutch include a cam mechanism having a pair of cam surfaces,
the pair of cam surfaces brings the pressure clutch closer to or separate the pressure clutch from the center clutch to reinforce or reduce a pressing force of the pressure clutch on one of the plurality of friction plates or one of the plurality of clutch plates upon the center clutch and the pressure clutch rotating relatively to each other.

3. The clutch apparatus according to claim 2, wherein
the protruding tooth is formed adjacent to the cam surface formed on the center clutch or the pressure clutch.

4. The clutch apparatus according to claim 1, wherein
the run-off is formed over an entire area of the external tooth in a face width direction.

5. The clutch apparatus according to claim 1, wherein
the protruding tooth is formed on the center clutch or the pressure clutch, whichever holds more clutch plates.

6. The clutch apparatus according to claim 1, wherein
the center clutch or the pressure clutch where the protruding tooth is formed is formed in such a manner that bottom lands on both sides of the protruding tooth in a circumferential direction of the center clutch or the pressure clutch where the protruding tooth is formed are recessed inward with respect to a root circle of the external teeth where the protruding tooth is formed.

7. A clutch apparatus that transmits and shuts off rotary drive power of a driving shaft to a driven shaft, the clutch apparatus comprising:

a plurality of clutch plates being ring shaped-flat plates placed facing a plurality of friction plates that are rotationally driven by rotary drive of the driving shaft, the plurality of clutch plates including internal teeth on inner peripheral portions of the flat plates;

a center clutch coupled to the driven shaft, the center clutch including external teeth mating with the internal teeth of part of the plurality of clutch plates; and a pressure clutch including external teeth mating with the internal teeth of other part of the plurality of clutch plates, the pressure clutch being configured to be placed adjacent to the center clutch in such a manner as to be displaceable in directions coming closer to and being separated from the center clutch, and press one of the plurality of friction plates or one of the plurality of clutch plates, wherein in the center clutch and the pressure clutch,
  each end surface facing each other is formed flat without protrusions or indentations, and
  each of the external teeth is formed on the same tip circle as each other,
the pressure clutch comprises a run-off formed by omitting at least one of the external teeth of the pressure clutch, the run-off being a smooth arc surface which is connected directly to two bottom lands of two of the external teeth of the pressure clutch adjacent to the run-off in a circumferential direction of the run-off in such a manner as to be level with the two bottom lands,
the center clutch comprises a protruding tooth protruding, as at least one tooth of the external teeth of the center clutch, in such a manner as to overhang the run off, and
the protruding tooth does not interfere with the two of the external teeth of the pressure clutch adjacent to the run-off, when the center clutch and the pressure clutch are rotationally displaced relative to each other.

8. A clutch apparatus that transmits and shuts off rotary drive power of a driving shaft to a driven shaft, the clutch apparatus comprising:

a plurality of clutch plates being ring shaped-flat plates placed facing a plurality of friction plates that are rotationally driven by rotary drive of the driving shaft, the plurality of clutch plates including internal teeth on inner peripheral portions of the flat plates;

a center clutch coupled to the driven shaft, the center clutch including external teeth mating with the internal teeth of part of the plurality of clutch plates; and a pressure clutch including external teeth mating with the internal teeth of other part of the plurality of clutch plates, the pressure clutch being configured to be placed adjacent to the center clutch in such a manner as to be displaceable in directions coming closer to and being separated from the center clutch, and press one of the plurality of friction plates or one of the plurality of clutch plates, wherein in the center clutch and the pressure clutch,
  each end surface facing each other is formed flat without protrusions or indentations, and
  each of the external teeth is formed on the same tip circle as each other,
the center clutch comprises a run-off formed by omitting at least one of the external teeth of the center clutch, the run-off being a smooth arc surface which is connected directly to two bottom lands of two of the external teeth of the center clutch adjacent to the run-off in a circumferential direction of the run-off in such a manner as to be level with the two bottom lands, the pressure clutch comprises a protruding tooth protruding, as at least one tooth of the external teeth of the pressure clutch, in such a manner as to overhang the run off, and the protruding tooth does not interfere with the two of the external teeth of the center clutch adjacent to the run-off, when the center clutch and the pressure clutch are rotationally displaced relative to each other.

9. The clutch apparatus according to claim 1, wherein
a portion of the center clutch inward with respect to the external teeth of the center clutch is flat without protrusions or indentations, and
a portion of the pressure clutch, which faces the portion of the center clutch, inward with respect to the external teeth of the pressure clutch is flat without protrusions or indentations.

10. The clutch apparatus according to claim 7, wherein
a portion of the center clutch inward with respect to the external teeth of the center clutch is flat without protrusions or indentations, and
a portion of the pressure clutch, which faces the portion of the center clutch, inward with respect to the external teeth of the pressure clutch is flat without protrusions or indentations.

11. The clutch apparatus according to claim 8, wherein
a portion of the center clutch inward with respect to the external teeth of the center clutch is flat without protrusions or indentations, and
a portion of the pressure clutch, which faces the portion of the center clutch, inward with respect to the external teeth of the pressure clutch is flat without protrusions or indentations.

12. The clutch apparatus according to claim 1, wherein
the center clutch comprises a center-side end surface including end surfaces of all of the external teeth of the center clutch except the protrusion tooth when the center clutch comprises the protrusion tooth, the center-side end surface being continuously flat without protrusions or indentations throughout a whole circumference of the center clutch, except the protrusion tooth when the center clutch comprises the protrusion tooth, and the pressure clutch comprises a pressure-side end surface facing the center-side end surface and including end surfaces of all of the external teeth of the pressure clutch except the protrusion tooth when the pressure clutch comprises the protrusion tooth, the pressure-side end surface being continuously flat without protrusions or indentations throughout a whole circumference of the pressure clutch, except the protrusion tooth when the pressure clutch comprises the protrusion tooth.

13. The clutch apparatus according to claim 7, wherein
the center clutch comprises a center-side end surface including end surfaces of all of the external teeth of the center clutch except the protrusion tooth, the center-side end surface being continuously flat without protrusions or indentations throughout a whole circumference of the center clutch, except the protrusion tooth, and the pressure clutch comprises a pressure-side end surface facing the center-side end surface and including end surfaces of all of the external teeth of the pressure clutch, the pressure-side end surface being continuously flat without protrusions or indentations throughout a whole circumference of the pressure clutch.

14. The clutch apparatus according to claim 8, wherein
the center clutch comprises a center-side end surface including end surfaces of all of the external teeth of the center clutch, the center-side end surface being continuously flat without protrusions or indentations throughout a whole circumference of the center clutch, and the pressure clutch comprises a pressure-side end surface facing the center-side end surface and including end surfaces of all of the external teeth of the pressure clutch except the protrusion tooth, the pressure-side end surface being continuously flat without protrusions or indentations throughout a whole circumference of the pressure clutch, except the protrusion tooth.

* * * * *